United States Patent
Hoferer

(10) Patent No.: US 11,045,876 B2
(45) Date of Patent: Jun. 29, 2021

(54) METHOD AND DEVICE FOR PRODUCING A THREE-DIMENSIONAL OBJECT WITH AN IMPROVED SURFACE QUALITY

(71) Applicant: EOS GmbH Electro Optical Systems, Krailling (DE)

(72) Inventor: Thomas Hoferer, Munich (DE)

(73) Assignee: EOS GmbH Electro Optical Systems, Krailling (DE)

( * ) Notice: Subject to any disclaimer, the term of this patent is extended or adjusted under 35 U.S.C. 154(b) by 677 days.

(21) Appl. No.: 15/555,179

(22) PCT Filed: Mar. 10, 2016

(86) PCT No.: PCT/EP2016/055203
§ 371 (c)(1),
(2) Date: Sep. 1, 2017

(87) PCT Pub. No.: WO2016/146493
PCT Pub. Date: Sep. 22, 2016

(65) Prior Publication Data
US 2018/0050423 A1 Feb. 22, 2018

(30) Foreign Application Priority Data
Mar. 13, 2015 (DE) .......................... 102015204630.3

(51) Int. Cl.
*B22F 12/00* (2021.01)
*B33Y 10/00* (2015.01)
(Continued)

(52) U.S. Cl.
CPC ............ *B22F 12/00* (2021.01); *B23K 26/082* (2015.10); *B23K 26/342* (2015.10);
(Continued)

(58) Field of Classification Search
CPC ................. B29C 64/268; B22F 3/1055; B22F 2003/1057; B23K 26/342; B23K 15/0086
See application file for complete search history.

(56) References Cited

U.S. PATENT DOCUMENTS 5,155,324 A * 10/1992 Deckard ................. B22F 3/004
264/497
5,640,667 A * 6/1997 Freitag .................. B29C 64/153
419/31
(Continued)

FOREIGN PATENT DOCUMENTS

CN 103143706 6/2013
DE 10065960 A1 12/2001
(Continued)

*Primary Examiner* — Geoffrey S Evans
(74) *Attorney, Agent, or Firm* — Seyfarth Shaw LLP

(57) ABSTRACT

An additive manufacturing process includes applying a layer of a building material on a building support or an already applied and selectively solidified layer and selectively solidifying the applied layer by electromagnetic radiation or particle radiation. All positions in the layer that correspond to a cross-section of the object are scanned by electromagnetic radiation or particle radiation such that at these positions the powder is melted at least at its surface. At least one cross-section includes an inner region and a surface region. The step of applying a layer and the step of selectively solidifying the layer are repeated until all cross-sections of the object are solidified. At least a portion of the surface region is scanned at least twice before scanning of the inner region starts.

14 Claims, 2 Drawing Sheets

(51) Int. Cl.
*B33Y 30/00* (2015.01)
*C22C 5/02* (2006.01)
*C22C 5/06* (2006.01)
*C22C 5/04* (2006.01)
*B29C 64/153* (2017.01)
*B33Y 50/02* (2015.01)
*B23K 26/082* (2014.01)
*B23K 26/342* (2014.01)
*B22F 10/10* (2021.01)

(52) U.S. Cl.
CPC ............ *B29C 64/153* (2017.08); *B33Y 10/00* (2014.12); *B33Y 30/00* (2014.12); *B33Y 50/02* (2014.12); *C22C 5/02* (2013.01); *C22C 5/04* (2013.01); *C22C 5/06* (2013.01); *B22F 10/10* (2021.01); *B22F 2207/11* (2013.01); *B22F 2301/25* (2013.01); *B22F 2998/10* (2013.01); *B22F 2999/00* (2013.01); *Y02P 10/25* (2015.11)

(56) References Cited

U.S. PATENT DOCUMENTS

| | | | | |
|---|---|---|---|---|
| 6,215,093 | B1 * | 4/2001 | Meiners | B22F 3/1055 219/121.61 |
| 10,035,188 | B2 * | 7/2018 | Weilhammer | B22F 3/1055 |
| 2006/0119012 | A1 * | 6/2006 | Ruatta | C23C 24/10 264/497 |
| 2007/0033805 | A1 * | 2/2007 | Jonsson | A44C 27/00 29/896.41 |
| 2007/0035069 | A1 * | 2/2007 | Wust | B22F 3/1055 264/497 |
| 2008/0169587 | A1 * | 7/2008 | Kihara | B22F 3/008 264/408 |
| 2013/0062655 | A1 | 3/2013 | Ng | |
| 2014/0249643 | A1 * | 9/2014 | Jones | A61L 27/306 623/23.41 |
| 2014/0348692 | A1 * | 11/2014 | Bessac | B22F 3/1055 419/53 |
| 2016/0167131 | A1 * | 6/2016 | Weilhammer | G05B 19/4099 419/53 |
| 2017/0164700 | A1 * | 6/2017 | Zito | B22F 3/1055 |
| 2018/0050423 | A1 * | 2/2018 | Hoferer | C22C 5/06 |
| 2018/0290241 | A1 * | 10/2018 | Mcclelland | B29C 64/153 |

FOREIGN PATENT DOCUMENTS

| | | | | |
|---|---|---|---|---|
| DE | 10208150 | A1 * | 9/2002 | ............ G03F 7/0037 |
| DE | 10208150 | B4 | 12/2009 | |
| DE | 102010029078 | A1 | 11/2011 | |
| WO | 2015000854 | A1 | 1/2015 | |

\* cited by examiner

METHOD AND DEVICE FOR PRODUCING A THREE-DIMENSIONAL OBJECT WITH AN IMPROVED SURFACE QUALITY

TECHNICAL FIELD OF THE INVENTION

The invention is directed to a method and a device for producing at least one three-dimensional object by layer-wise solidification of a building material in powder form by means of electromagnetic radiation or particle radiation. In particular, the invention is directed to a method and a device, wherein a surface region is irradiated repeatedly in the course of the layer-wise solidification.

BACKGROUND OF THE INVENTION

An essential criterion for the applicability of a generative layer-wise production method in the production of objects is the surface quality that can be attained by said generative layer-wise production method. Undesirable surface roughness can be caused, inter alia, by the fact that during the manufacturing process of an object unsolidified powder adheres so strongly to the surface of the object to be produced that a complicated mechanical finishing is required in order to attain a smooth surface.

The German patent application publication DE 100 65 960 A1 describes an approach to reduce the effort in the mechanical post-processing of the surfaces. Said document proposes to repeatedly irradiate edge regions of the workpiece to be produced, wherein first a beam of high energy density is scanned along the edge of an object cross-section of the workpiece to be produced, and subsequently a second irradiation of the edge with a lower energy density is carried out. Despite these measures, however, one cannot do without a complex mechanical polishing of the surfaces. Moreover, DE 100 65 960 A1 does not provide a solution for a surface roughness at the bottom and top surfaces of the workpiece to be produced.

SUMMARY OF THE INVENTION

It is therefore an object of the present invention to provide a device and a method by means of which improved objects can be produced in a generative method for a layer-wise production. Such an improvement is in particular seen preferably in an improvement of the surface properties, i.e. in the improvement of the approaching of the surface of an object produced to objectives such as a low porosity and/or gloss properties. Therefore, the objective is particularly to greatly reduce the need for mechanical post-processing to achieve a smooth surface.

The object is achieved by a method according to claim 1, a device according to claim 13 and a computer program according to claim 14. Further developments of the invention are each given in the dependent claims. Moreover, the devices according to the invention can also be further developed by the features of the methods given in the dependent claims.

According to the invention, a method for the production of at least one three-dimensional object by layer-wise solidifying a building material in powder form by means of electromagnetic radiation or particle radiation comprises the following steps: a step of applying a layer of the building material in powder form on a building support or an already applied and selectively solidified layer of the building material, a step of selectively solidifying the applied layer by means of electromagnetic radiation or particle radiation, wherein all positions in the applied layer that correspond to a cross-section of the at least one object to be produced are scanned by electromagnetic radiation or particle radiation such that at these positions the powder is melted at least at its surface by the thermal energy introduced by the radiation. The step of applying a layer of the building material in powder form and the step of selectively solidifying the applied layer are repeated until all cross-sections of the at least one three-dimensional object to be produced are solidified. In particular, at least one cross-section comprises an inner region and a surface region of the at least one object to be produced and in at least one of the selective solidification steps at least a portion of the surface region is scanned at least twice before scanning of the inner region starts.

Surprisingly, it has been found that particularly smooth surfaces of the object to be produced can be achieved if surface regions within a layer are irradiated at least twice prior to the inner region of the object cross-section to be solidified in this layer. In doing so, in each of these at least two irradiation processes preferably a local temperature is induced in the impact region of the electromagnetic or particle radiation on the building material, which causes a local fusion effect in the building material (for example by melting at least at the surface, sintering etc.). The same applies in the following if irradiating of at least three times is mentioned.

With this approach, the invention firstly differs from the one-time irradiation of the surface regions. Secondly, the invention abandons to implement a multiple irradiation of the surface regions only after scanning of the inner region, or thirdly to combine a single irradiation of the surface regions before scanning the inner region with a one-time or multiple irradiation of the surface regions after scanning the inner region. Instead, the inventor found that ideal surfaces can only be achieved with the method according to the invention (wherein irradiation of the surface regions after scanning of the inner region is still possible in principle). A possible explanation for this surprising effect discovered by the inventor may be found in the fact that in the method according to the invention the inner region of an object cross-section that has not yet been solidified is cooler when compared to the prior art, in which first the inner region of an object cross-section is melted by means of radiation.

The device and method according to the invention can be applied in a particularly advantageous way when applied to manufacturing processes in which a metal powder is used as a building material. In the case of metallic objects a surface roughness is usually particularly striking since the roughness of the surface directly influences the surface gloss. Exceptionally smooth surfaces will also show a strong gloss.

The advantages of the invention show particularly in the production of objects with a precious metal content which corresponds to at least 50 wt % of a precious metal. In particular for objects with a high precious metal content the appearance of the object often plays an important role. In this case, the invention provides surfaces having a high shininess without additional mechanical processing steps. If the precious metal used is palladium, a material with a fineness of at least 500/1000, preferably at least 950/1000 can be used, for example. For platinum, the usual precious metal contents are at least 585/1000, at least 750/1000, at least 800/1000 or at least 950/1000. For silver, the fineness is usually at least 800/1000 or at least 925/1000. Gold usually has a fineness of at least 333/1000 (corresponding to 8 karat) with various higher common precious metal contents of e.g. 585/1000 (14 karat), 750/1000 (18 karat) up to 999/1000 (24 karat). Powders with all mentioned commonly used precious metal contents can be used as a building material. However, in addition to that, precious metal powders of a different, in particular higher, fineness can also be used.

The invention can be applied advantageously when gold with a carat number of at least 14, preferably at least 18, is used as a building material. Despite the comparatively low heat capacity of gold and the high thermal conductivity, glossy surfaces could be achieved with said building material.

The method according to the invention is suited not only for the production of smooth partial surfaces, but can naturally also be used for the production of objects whose entire side surface is glossy, when within each selective solidification step—with the possible exception of the selective solidification steps of a lowermost and/or an uppermost layer of the building material of the object—at least a portion of the surface region is scanned at least twice before scanning of the inner region starts, i.e. in particular when in each layer the entire surface region of an object is scanned at least twice before scanning the inner region.

It has been found that particularly advantageous results can be obtained if in at least one of the selective solidification steps before scanning of the inner region starts at least a portion of the surface region is scanned in such a way that the radiation also penetrates a region which is outside the cross-section and directly adjoins the surface region. In particular if a surface region is irradiated again it is advantageous to permit radiation to also penetrate a region directly adjacent to the surface region outside the cross-section.

The method according to the invention is particularly advantageous for surface regions of an object which, in terms of the position of the object during its layer-wise production, form a part of downwardly or upwardly facing regions, i.e. downwardly or upwardly facing surface regions, of the at least one object to be produced and are accordingly located directly above unsolidified powder or are directly covered by unsolidified powder. In this case, it has been found that the advantageous surface properties of the object produced according to the invention are obtained in particular if for smooth downwardly or upwardly facing regions the corresponding surface regions are scanned successively at least three times at the lateral edge of the downwardly or upwardly facing regions. Alternatively (or supplementary), scanning can also be performed at least twice before scanning of the inner region starts and at least once after scanning the inner region—the effect of this second approach is comparable to that one of the first-mentioned approach.

Particularly in the case of downwardly facing regions, a distinct improvement in surface smoothness compared to the method of the prior art could be observed for these two approaches.

According to a preferred method, especially in the case of downwardly or upwardly facing regions in at least one of the selective solidification steps of a surface region, preferably the middle one of the solidification steps, at least a portion of the surface region is scanned in such a way that the radiation also penetrates a region which is outside the cross-section and directly adjoins the surface region, and in at least another one of the selective solidification steps, preferably the first and/or last one of the solidification steps, before scanning of the inner region starts at least a portion of the surface region is scanned in such a way that the radiation substantially does not penetrate a region which is outside the cross-section and directly adjoins the surface region.

According to the invention, a device for producing at least one three-dimensional object by layer-wise solidifying a building material in powder form by means of electromagnetic radiation or particle radiation comprises: a building support for carrying the at least one object to be produced, an application device for applying a layer of the building material in powder form on the building support or an already applied and selectively solidified layer of the building material, a selective solidification device which is configured to scan all positions in the applied layer that correspond to a cross-section of the at least one object to be produced by means of electromagnetic radiation or particle radiation such that at these positions the powder is melted at least at its surface by the thermal energy introduced by the radiation, wherein at least one cross-section comprises an inner region and a surface region of the at least one object to be produced, and a control unit which controls the application device and the selective solidification device in such a way that a step of applying a layer of the building material in powder form and a step of selectively solidifying the applied layer are repeated until all cross-sections of the at least one three-dimensional object to be produced are solidified. The control unit is configured so that in at least one of the selective solidification steps at least a portion of the surface region is scanned at least twice before scanning of the inner region starts.

A computer program according to the invention comprises a sequence of instructions that enable the inventive device for production of at least one three-dimensional object to carry out a method according to the invention when the computer program is executed by the control unit.

Further features and expediencies of the invention result from the description of an exemplary embodiment with the aid of the attached drawings. The drawings show:

DETAILED DESCRIPTION OF THE EMBODIMENTS

Figure 1:
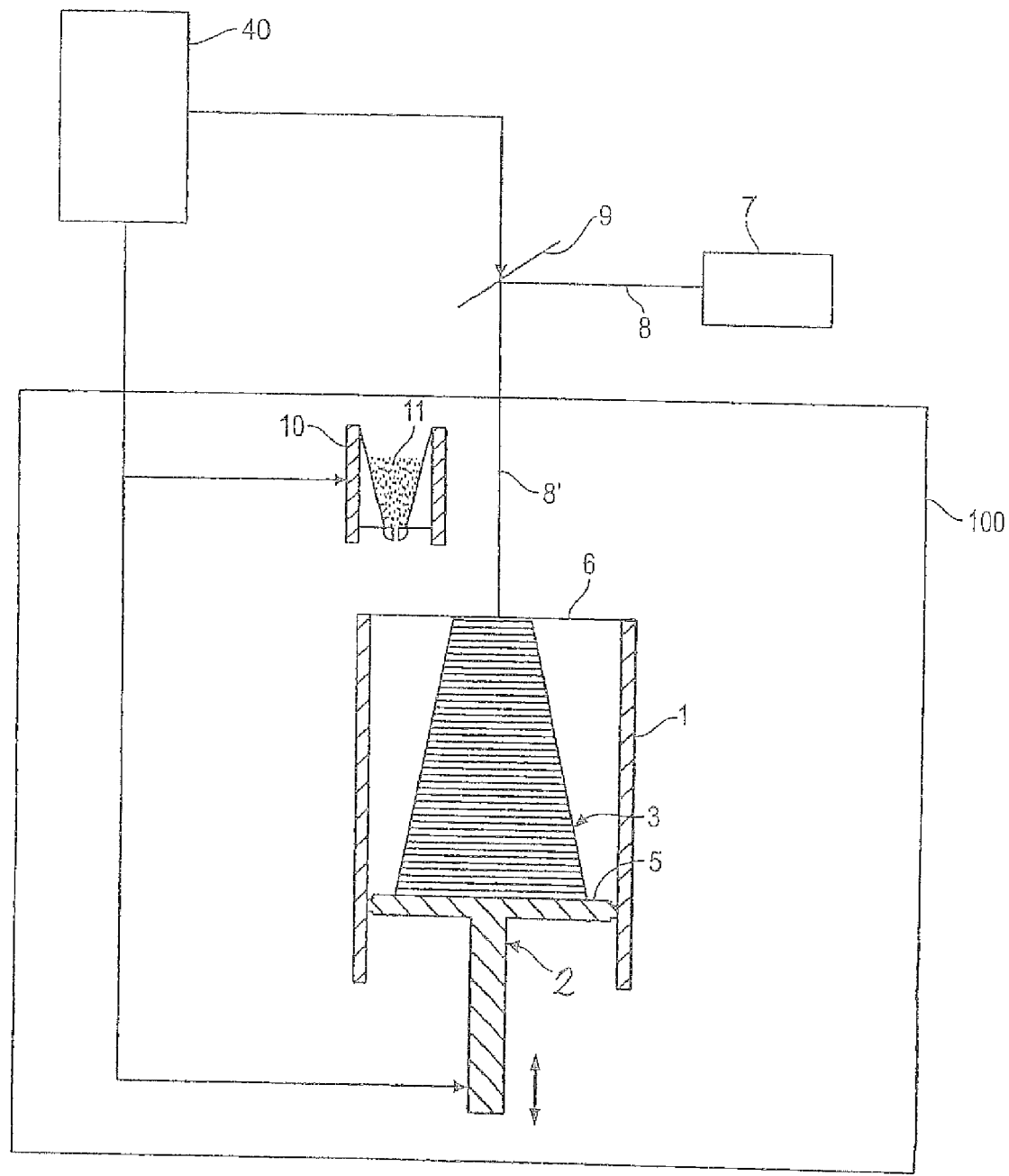
FIG. 1 shows a schematic view of a laser sintering device as an example of a device for producing a three-dimensional object layer by layer and FIG. 2 shows a cut through a sub-region of an object to be produced perpendicular to the layers in order to depict the method according to the invention.

FIG. 1 schematically shows a laser sintering device as an example of a device for producing a three-dimensional object layer by layer by means of a generative production method. The device in which the method according to the invention can be implemented after adjustment of the control unit 40 comprises a container 1 open to the top with a carrier 2 which is movable therein in the vertical direction and which carries the object 3 to be formed. The carrier 2 is adjusted in the vertical direction such that the respective layer of the object to be solidified is in a working plane 6. Furthermore, an application device 10, 11 is provided for applying the building material in powder form to be solidified by electromagnetic radiation. A laser 7 is provided as a source of the electromagnetic radiation. The laser beam 8 produced by the laser 7 is deflected by a deflecting device 9 to the working plane 6 in a process chamber 100 of the device and is focused at a predetermined point in the working plane 6. The control unit 40 controls the components of the device in a coordinated manner in order to implement the building process. Among other things, controlling is implemented depending on CAD data of the object 3 to be produced.

All powders or powder mixtures suitable for a laser sintering process can be used as building material in powder form. Such powders include, for example, plastic powders such as polyamide or polystyrene, PEEK, metal powders such as stainless steel powders or other metal powders adapted to the particular purpose, in particular alloys, plastic-coated sand or ceramic powders.

Operation of the laser sintering device generally takes place such that the coating device 10, 11 moves over the build area and applies a powder layer of a predetermined thickness d, which is not necessarily the same for all layers, in the entire build area. The cross-section of the object 3 is then irradiated with the laser beam in the respective layer in the working plane 6 so that there the powder melts at least at its surface so that after cooling the material exists as a solid body, i.e. has solidified. A complete melting by means of the radiation energy can be referred to as a laser melting process. The carrier 2 is then lowered and a new powder layer applied. The production of the object 3 thus takes place layer by layer. The finished object 3 is removed from the powder bed after completion of the manufacturing process.

Although just a single object 3 is shown in FIG. 1, it is possible to simultaneously produce several objects in the container 1 without an additional effort. In such a case, the powder is solidified by means of irradiation within a layer at all positions that correspond to a cross-section of one of the objects.

Within an object cross-section one can distinguish between a contour region and an inner region. The contour region corresponds to the edge region (edge in the mathematical-topological sense, thus also comprises edges at recesses in the object cross-section) of the object, whereas the inner region corresponds to the entire cross-sectional area minus the contour region. In the finished object, the contour region is then located at the outer surface or else at the inner surface as well (if cavities or channels are present in the object).

A surface region in the sense of the present application is a contour region as defined above. In technical jargon the term "downskin" regions is used for areas situated directly above unsolidified powder during production. In technical jargon the term "upskin" regions is used for areas that are after being solidified and during the further manufacturing process directly covered by powder which is not to be solidified.

Figure 2:
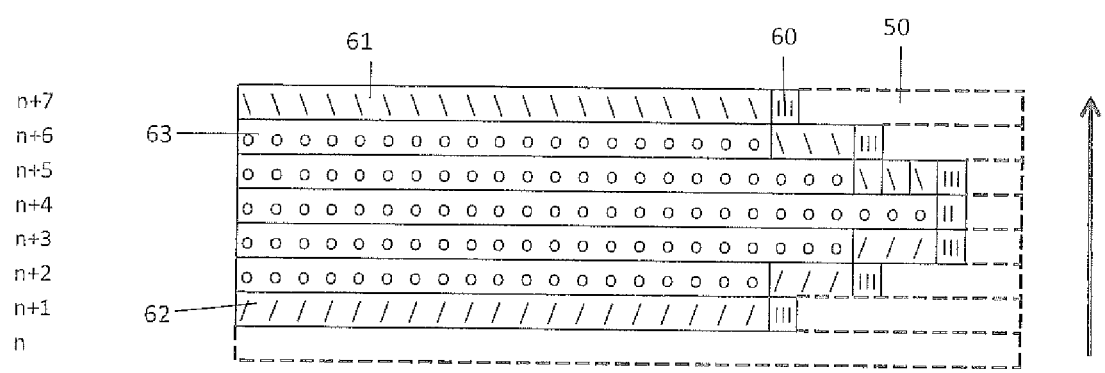

FIG. 2 summarizes what is considered as a surface region according to the present application. The figure shows a detail of the region on the right-hand side of an already finished portion of the object 3 to be produced, the drawing showing portions of eight object cross-sections n to n+7. The arrow on the right side of FIG. 2 indicates the building direction, i.e. the sequence in which the layers n to n+7 were successively applied and selectively solidified.

FIG. 2 shows all regions 50 in which the powder remains unsolidified without a filling and with a dashed line as a border. All positions corresponding to the surface region 60 in a layer are denoted by vertical lines, all positions 61 of the solidified portion of the object which are upwardly facing and covered by unsolidified powder during the production (i.e. during the arrangement in the layer-wise building device, e.g. the laser sintering device of FIG. 1) ("upskin") are denoted by a slash inclined to the left, all positions 62 of the solidified portion of the object which are downwardly facing and situated above unsolidified powder during the production (i.e. during the arrangement in the layer-wise building device, e.g. the laser sintering device of FIG. 1) ("downskin") are denoted by a slash inclined to the right and all positions 63 which are located in the inner region of the part of a layer to be solidified are denoted by a circle.

The following describes how a method according to the invention can be implemented in the laser sintering device described above, wherein only the specific features as compared to a conventional procedure are described:

In a generative production method, such as a laser sintering process, in which objects are produced layer by layer from a building material, initially a CAD model of the object to be produced exists which is divided into layers (so-called slicing) that correspond to the layers of the building material to be solidified. These data (also called production data) which contain the structure information about the object are processed by the control device 40 for production of the object. Thus, it is already known how an object cross-section consists of an inner region and a surface region even before the object is produced. In particular, the production data show which regions of an object cross-section are "downskin" regions or "upskin" regions in the layer-wise building device.

According to the invention, when producing an object based on the production data a surface region is first irradiated by laser radiation in a layer in which an object cross-section is solidified. In particular, the energy for solidification in the surface region is introduced by means of at least two successive irradiation processes. As a result, the overall radiation power for solidification is not delivered at once but in several portions. As a result, the temperature changes are less abrupt and there is more time for a temperature compensation within the region to be melted.

For solidifying the building material in a surface region of an upskin/downskin region the radiation is directed at least three times to the material for solidifying said material.

The method according to the invention is explained below with reference to FIG. 2:

After application of the layer n+1 the surface region 60 is first irradiated successively at least twice. Subsequently, the remaining region of layer n+1 is irradiated for solidification. Since the region 62 of layer n+1 shown in FIG. 2 is situated entirely above layer n consisting of unsolidified powder, it is a downskin region. Therefore, in this layer the surface region 60 is irradiated at least three times prior to the remaining region or is first irradiated twice and then irradiated again at least once after irradiation of the remaining region.

It should be noted that the inner region of layer n+1 is denoted by slashes and not by circles because it is a downskin region. The surface region 60 in layer n+1 at the same time forms part of the downskin region, too, but is not denoted as such.

In the layer n+2, only a part of the inner region 63 is a downskin region 62. Since in this layer the surface region 60 confines the downskin region 62, the surface region is irradiated at least three times in this layer, too (as in layer n+1). The remaining downskin region in layer n+2 is irradiated together with the inner region 63.

Layer n+3 is treated like layer n+2.

There is no downskin region in layer n+4. Therefore, in this layer the surface region 60 is irradiated at least twice before the inner region 63 is irradiated, wherein irradiating twice is generally sufficient, further irradiations of the surface region 60 being possible, however. The minimum number of irradiations is coded by the number of vertical lines in a surface region 60 in FIG. 2.

The treatment of layers n+5 and n+6 is not different from the treatment of layers n+2 and n+3. The only difference is that there are upskin regions instead of downskin regions in layers n+5 and n+6. Likewise, layer n+7 comprising the upskin region is treated similarly to layer n+1.

It is important in the method according to the invention that each beam incidence, when irradiating a surface region several times, not only preheats the building material but also introduces enough energy for the building material to be melted at least at its surface.

For 18 karat gold powder of as a building material, for example, the following procedure was used:

Within each object cross-section, an exposure of the surface region with a deflection speed of the laser focus on the powder surface of 350 mm/s at a laser power of 80 Watt at a predetermined beam diameter (the dimensions of which are familiar to a person skilled in the art) was first performed. In doing so, the beam was moved along the surface region in such a way that the laser focus preferably did not impact any positions outside the object cross-section. The second exposure of the surface region was subsequently performed with a deflection speed of the beam focus of 350 mm/s at a laser power of 80 Watt and at the same predetermined beam diameter. In doing so, the beam was guided in such a way that a region of a width of 0.015 mm situated outside the object cross-section was also irradiated (i.e. powder that is actually not to be solidified within the layer). Finally, a third irradiation of the surface region was performed at which the deflection speed was 400 mm/s at a laser power of 80 Watt and at the same predetermined beam diameter. As in the case of the first irradiation, the laser focus was also guided during the third irradiation in such a way that, if possible, no positions outside the object cross-section were irradiated. In particular, less energy was introduced by the third irradiation than by the first and second irradiation. After exposure of the surface region in an object cross-section the inner region of the object cross-section was irradiated each time.

Comparative tests were carried out in which the surface region was either irradiated only once, or the surface region was irradiated twice after irradiating the inner region, or the surface region was irradiated once before and once after irradiating the inner region. None of these comparative tests yielded comparably smooth surfaces to the method according to the invention. A complex polishing process was always required to obtain a glossy surface.

Furthermore, the advantages of the invention are particularly striking at the surface regions of downskin regions.

Due to the advantageous surfaces which can be achieved by the method according to the invention with the device according to the invention, the method according to the invention is particularly suitable for the production of objects for which flawless surfaces are of particular importance, i.e. in particular for the production of objects for jewelry purposes or objects made of a powder with a precious metal content. Here, predominantly gold, silver, platinum, palladium or copper, or mixtures thereof, are to be considered as precious metal constituents in the powder. The value of the objects produced naturally increases with the precious metals' fineness.

Furthermore, the method is particularly suitable for objects made of materials which exhibit a strong gloss, i.e. in particular objects which are produced by solidification of a metal powder.

Even though the method according to the invention has been described by way of a laser sintering device, it can be applied to any generative layer-wise production methods in which the solidification takes place by means of electromagnetic radiation or energetic particles (electrons, for example). In particular, the irradiation for solidification can be directed upon the building material through masks, the masks each being open in the region to be irradiated. Moreover, a method with an associated device is also conceivable in which the beam focus has a larger area.

The invention claimed is:

1. A method for the production of at least one three-dimensional object by layer-wise solidification of a building material in powder form by electromagnetic radiation or particle radiation comprising the following steps:
   a step of applying a layer of the building material in powder form on a building support or an already applied and selectively solidified layer of the building material;
   a step of selectively solidifying the applied layer by electromagnetic radiation or particle radiation, wherein all positions in the applied layer that correspond to one of a plurality of cross-sections of the at least one object to be produced are scanned by the electromagnetic radiation or particle radiation such that at the positions the powder is melted at least at a surface of the powder by the thermal energy introduced by the radiation and allowed to solidify thereafter,
   wherein at least one of the cross-sections comprises an inner region and a surface region of the at least one object to be produced;
   wherein the step of applying the layer of the building material in powder form and the step of selectively solidifying the applied layer are repeated until all of the cross-sections of the at least one three-dimensional object to be produced are solidified; and
   wherein in at least one of the selective solidification steps all positions in at least a portion of the surface region are scanned at least twice before scanning of the inner region starts.

2. A method according to claim 1, wherein a metal powder is used as the building material.

3. A method according to claim 2, wherein the building material has a precious metal content of at least 50 wt %.

4. A method according to claim 3, wherein gold powder with a carat number of at least 14 is used as the building material.

5. A method according to claim 1, wherein in each selective solidification step, with the exception of the selective solidification steps of a lowermost and/or an uppermost layer of the building material of the object, at least the portion of the surface region is scanned at least twice before scanning of the inner region starts.

6. A method according to claim 1, wherein the entire surface region of at least one of the cross-sections is scanned at least twice before scanning of the inner region starts.

7. A method according to claim 1, wherein in at least one of the selective solidification steps before scanning of the inner region starts at least a portion of the surface region is scanned in such a way that the radiation also penetrates a region which is outside the cross-section and directly adjoins the surface region.

8. A method according to claim 1, wherein surface regions which, in terms of the position of the at least one object to be produced during its production, form a part of downwardly or upwardly facing regions of the at least one object to be produced are scanned at least three times before scanning of the inner region starts.

9. A method according to claim 8, wherein surface regions which, in terms of the position of the at least one object to be produced during its production, form a part of downwardly facing regions of the at least one object to be produced are scanned at least three times before scanning of the inner region starts.

10. A method according to claim 8, wherein in at least one of the selective solidification steps, before scanning of the inner region starts at least a portion of the surface region is scanned in such a way that the radiation also penetrates a region which is outside the cross-section and directly adjoins the surface region and wherein in at least one of the selective solidification steps, before scanning of the inner region starts at least a portion of the surface region is scanned in such a way that the radiation substantially does not penetrate a region which is outside the cross-section and directly adjoins the surface region.

11. A method according to claim 1, wherein surface regions which, in terms of the position of the at least one object to be produced during its production, form a part of downwardly or upwardly facing regions of the at least one object to be produced are scanned at least twice before scanning of the inner region starts and at least once after scanning of the inner region.

12. A method according to claim 11, wherein surface regions which, in terms of the position of the at least one object to be produced during its production, form a part of downwardly facing regions of the at least one object to be produced are scanned at least twice before scanning of the inner region starts and at least once after scanning of the inner region.

13. A device for producing at least one three-dimensional object by layer-wise solidifying a building material in powder form by electromagnetic radiation or particle radiation, the device comprising:
- a building support for carrying the at least one object to be produced,
- a recoater for applying a layer of the building material in powder form on the building support or an already applied and selectively solidified layer of the building material;
- a laser or particle beam source and a deflector that are configured to scan all positions in the applied layer that correspond to one of a plurality of cross-sections of the at least one object to be produced by means of electromagnetic radiation or particle radiation such that at the positions the powder is melted at least at a surface of the powder by the thermal energy introduced by the radiation and allowed to solidify thereafter, wherein at least one of the cross-sections comprises an inner region and a surface region of the at least one object to be produced; and
- a controller that controls the application device and the selective solidification device in such a way that the step of applying the layer of the building material in powder form and the step of selectively solidifying the applied layer are repeated alternatingly until all of the cross-sections of the at least one three-dimensional object to be produced are solidified,
wherein the controller is configured so that in at least one of the selective solidification steps all positions in at least a portion of the surface region are scanned at least twice before scanning of the inner region starts.

14. A method for the production of at least one three-dimensional object by layer-wise solidification of a building material in powder form by electromagnetic radiation or particle radiation comprising:
providing a command set that is transmitted to a controller and embedded in a non-transitory computer readable medium, the command set including at least:
- a step of applying a layer of the building material in powder form on a building support or an already applied and selectively solidified layer of the building material; and
- a step of selectively solidifying the applied layer by electromagnetic radiation or particle radiation, wherein all positions in the applied layer that correspond to one of a plurality of cross-sections of the at least one object to be produced are scanned by the electromagnetic radiation or particle radiation such that at the positions the powder is melted at least at a surface of the powder by the thermal energy introduced by the radiation and allowed to solidify thereafter,
wherein at least one of the cross-sections comprises an inner region and a surface region of the at least one object to be produced;
wherein the step of applying the layer of the building material in powder form and the step of selectively solidifying the applied layer are repeated until all of the cross-sections of the at least one three-dimensional object to be produced are solidified; and
wherein in at least one of the selective solidification steps all positions in at least a portion of the surface region are scanned at least twice before scanning of the inner region starts.

\* \* \* \* \*